May 21, 1968 A. BOPP ETAL 3,384,707

CORRECTION OF TIMING ERRORS IN A TELEVISION SIGNAL PRODUCED FROM A MAGNETIC TAPE RECORD THEREOF

Filed March 16, 1965 7 Sheets-Sheet 1

Inventors:
Achim Bopp
Gerhard Krause by Michael J. Striker
attorney

May 21, 1968 A. BOPP ET AL 3,384,707

CORRECTION OF TIMING ERRORS IN A TELEVISION SIGNAL PRODUCED FROM A MAGNETIC TAPE RECORD THEREOF

Filed March 16, 1965 7 Sheets-Sheet 2

Inventors:
Achim Bopp
Gerhard Krause by Michael J. Striker
attorney

May 21, 1968 A. BOPP ET AL 3,384,707

CORRECTION OF TIMING ERRORS IN A TELEVISION SIGNAL
PRODUCED FROM A MAGNETIC TAPE RECORD THEREOF

Filed March 16, 1965 7 Sheets-Sheet 3

Inventors:
Achim Bopp
Gerhard Krause by Michael J. Striker
attorney

Inventors:
Achim Bopp
Gerhard Krause by Michael J. Striker
attorney

May 21, 1968 A. BOPP ET AL 3,384,707

CORRECTION OF TIMING ERRORS IN A TELEVISION SIGNAL PRODUCED FROM A MAGNETIC TAPE RECORD THEREOF

Filed March 16, 1965 7 Sheets-Sheet 5

Inventors:
Achim Bopp
Gerhard Krause by Michael J. Striker
attorney

Inventors:
Achim Bopp
Gerhard Krause by Michael J. Striker
attorney

Inventors:
Achim Bopp
Gerhard Krause by Michael J. Striker
attorney 3,384,707

CORRECTION OF TIMING ERRORS IN A TELEVISION SIGNAL PRODUCED FROM A MAGNETIC TAPE RECORD THEREOF

Achim Bopp, Furtwangen, and Gerhard Krause, Darmstadt, Germany, assignors to Fernseh G.m.b.H., Darmstadt, Germany Filed Mar. 16, 1965, Ser. No. 440,090
Claims priority, application Germany, Mar. 24, 1964, F 42,405; Sept. 25, 1964, F 44,055; Jan. 30, 1965, F 45,105
17 Claims. (Cl. 178—6.6)

This invention relates to a method and apparatus for correcting timing errors in television signals, in particular, television signals reproduced from a magnetic tape record thereof, by altering the signal delay time by means of an error voltage derived by comparison of the timing of the synchronizing signals with that of a reference signal.

It has already been proposed, in equipment for the magnetic recording of television signals, to correct those residual timing errors which are not removed by electromechanical control devices, by altering the signal delay time. For this purpose television signals taken from the magnetic store are applied to a delay line with an electrically variable delay time, which is controlled by means of an error voltage derived by comparison of the timing of the synchronizing signal and of a constant-frequency synchronizing signal taken from a master impulse generator.

To produce the delay in timing of the television signals there have formerly been employed delay lines of which the delay time is altered by influencing the values of the capacitive or inductive elements by means of the error voltage. As a rule the capacitances of the delay line are formed as controllable elements, capacitors of voltage-variable capacitance, known as varicaps or varactor diodes, being used.

An arrangement for timing error correction carried out in this manner only works satisfactorily, however, as long as the variations in delay which arise from variations in the amplitude of the television signal itself are insignificant. This is only the case for black and white television, however, and no longer applies in the case of color television signals employing a color sub-carrier. For such signals, even very small amplitude-dependent phase shifts of the color sub-carrier (known as differential phase distortion) give rise to insupportable color distortions.

Another disadvantage of the known arrangement is that the range of variations of the delay time is small in relation to the total delay of the line. The consequence of this is that the mean delay time of the variable delay line must be substantially greater than the maximum value of the timing error to be equalised.

Finally it is necessary, in order to obtain a linear relation between the timing error and the delay time, to predistort the control voltage for the variable capacitors very considerably, since the voltage used to alter the capacitance of the variable capacitances must rise in proportion to the fourth power of the error voltage obtained by phase comparison, which represents a further disadvantage of the known arrangement.

In co-pending patent application Ser. No. 400,866, now U.S. Patent No. 3,238,300, it has been proposed to use as the variable delay line, instead of a single line having variable capacitive and/or inductive elements, a number of delay lines of constant delay time connected in series, and selectively to short-circuit these lines or connect them in circuit under the control of the error voltage by way of an analogue/digital converter. The individual delay times of these delay lines preferably form a geometrical progression.

In such an arrangement the difficulty of amplitude-dependent variations of delay is completely avoided, and it may therefore be employed without restriction for the control of color television signals.

If however, as is usually the case in practice, a wide range and also a high accuracy of timing error correction are required at the same time, then the arrangement described above requires delay lines of progressively increasing delay time, it being necessary for each line to possess the same high absolute accuracy. For the delay lines of longer delay time this necessitates a very high relative accuracy, which in practice can be attained only with difficulty.

It is therefore an object of the present invention to provide an improved method and apparatus for correcting timing errors in television signals, which will not be subject to the aforementioned limitations.

It is still another object of this invention to provide an improved apparatus for correcting timing errors in a television signal, which is especially adapted for television signals reproduced from a magnetic tape record thereof.

One particular form of the present invention overcomes this difficulty by providing apparatus for equalizing timing errors in a television signal, in which said television signal and a signal impulse derived therefrom are progressively delayed step by step in successive stages, that stage is determined at the output of which the impulse and a reference impulse derived from a reference signal occur simultaneously, and the television signal is applied to an output terminal from a stage in which it has been subjected to delay equal to that suffered by said signal impulse.

In a preferred embodiment of apparatus according to this form of the invention, the signal in which timing errors are to be corrected is applied to a delay line provided with tappings, and the signal is applied to an output terminal from that tapping at which the signal impulse and the reference impulse occur coincidently.

Apparatus according to the invention possesses the fundamental advantage that the accuracy of the timing correction is no longer limited by the characteristics of the delay line used for delaying the signal. In addition, in the same manner as in the alternative proposal using switched delay lines mentioned above, delay lines with invariant capacitive and inductive elements are empolyed, so that the apparatus is free from effects dependent upon signal amplitude, and may therefore be used not only for black and white, but also for color television signals.

The necessity of obtaining a control voltage increasing with increasing difference in timing between the compared impulses and of modifying this voltage by means of non-linear circuit elements is also avoided. Finally, the overall delay time of apparatus according to the invention need not exceed the maximum error in timing to be corrected.

Apparatus according to this aspect of the invention includes delay lines which are preferably provided with tappings at equal intervals of delay time. Alternatively, single delay lines connected in series and having preferably equal delay times may be used. Coincidence stages are employed in order to determine the delay to be included in circuit, that is the delay corresponding to the difference in timing between the synchronizing signal and the reference signal. To these coincidence stages is applied on the one hand, from the tappings of a delay line, the stepwise delayed impulse derived from the synchronizing signal, and on the other hand an impulse derived from the reference signal. That coincidence stage to which the impulses are applied simultaneously provides an output signal which closes a switch to connect to the output signal from a corresponding tapping of another delay line a television signal having the same delay as the impulse applied to that coincidence stage. In order that the switch shall remain closed during the interval between impulses, each coincidence stage is associated with a store which retains each output signal from a coincidence stage until the occurrence of the next.

Instead of using two identical delay lines for delaying firstly the impulse derived from the synchronizing signal and secondly the television signal itself, both the impulse and also the television signal may be derived from one and the same delay line.

In order that at least one coincidence stage shall respond whatever the difference in timing between the impulses, the sum of the lengths of the impulses controlling the coincidence stages must be greater than the delay experienced by the signals in passing from one tapping to the next of the delay line. However, it may then occur that two neighbouring coincidence stages provide output impulses simultaneously. With a sufficiently fine division of the delay line into a large number of stages and corresponding smaller delay per stage this disadvantage is not significant. By suitable means described later, however, the closing of two switches simultaneously may be avoided.

For a very high accuracy of timing error correction such as is necessary for example in color television to avoid excessive phase-rotation of the color sub-carrier, the impulses by correspondence of which the coincidence is determined must be correspondingly brief; their half-amplitude width may amount for example to some 50 nanoseconds. In order that the impulses derived from the synchronizing signal component of the color television signal shall be transmitted with small distortion through the delay line, the upper cut-off frequency of the delay line must be substantially higher than would be necessary for the transmission of the television signal itself. The in any case high cost of the wideband delay line is thus further increased.

To avoid this disadvantage, the derivation from the television signal of the impulses for determination of coincidence with the reference impulses may be effected only after the signal has been delayed, so that it is then necessary to delay only the television signal itself. The advantage is thus attained, that the cut-off frequency of the delay line need not be made higher than the upper cut-off frequency of the television signal, e.g. some 5 mc./s. Since the total delay of the line is employed as the range of variation, the delay line may be made relatively short and of small bulk, so that it may be built into a plug-in unit.

An emobdiment of apparatus according to the invention contains a delay line provided with tappings, to the input of which a television signal exhibiting timing errors is applied. At each tapping of the delay line there are provided arrangements for separating the line synchronizing impulses from the television signal, as well as for the derivation from the leading edge of the line synchronizing impulses of narrower impulses used to determine coincidence with a reference impulse of constant repetition rate derived from a master impulse generator.

Other objects and advantages will be readily apparent from the following description and claims when considered with the accompanying drawing, in which:

Figure 1:
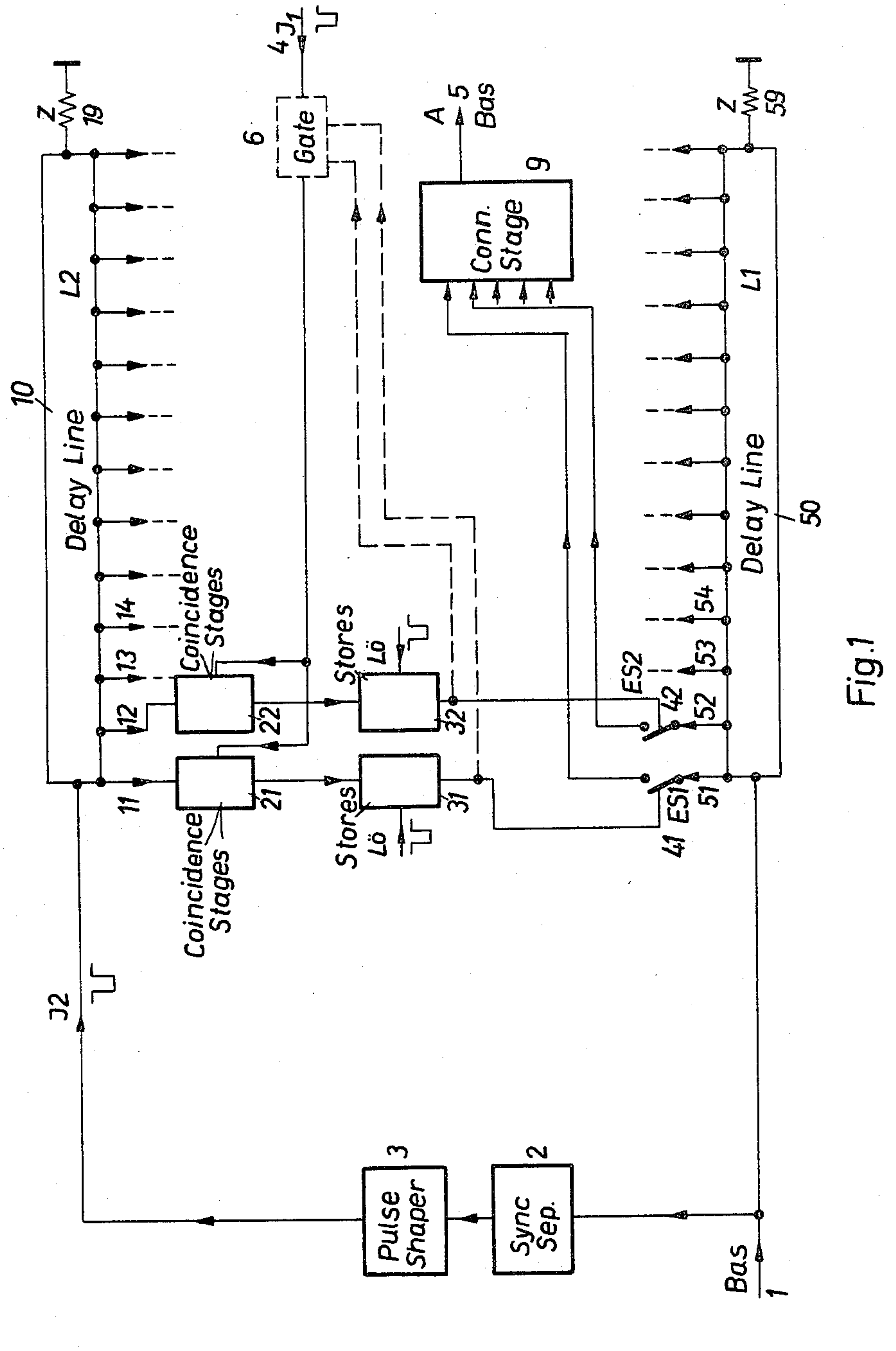
FIGURE 1 shows schematically apparatus according to the invention making use of two identical delay lines.

In FIGURE 1, the devices denoted generally by references 10 and 50 are two identical delay lines provided with respective, preferably equi-spaced tappings 11, 12, 13, 14 . . . and 51, 52, 53, 54 . . . . In the practical application of the apparatus for correcting the timing errors in a television signal reproduced from magnetic tape the difference in timing between signals taken from adjacent tappings may, for example, be 30 nanoseconds. The signal BAS arriving by way of lead 1 may be a television signal reproduced from a magnetic tape, that is a signal composed of a video component and a synchronizing component. This signal is applied on the one hand directly to the input of delay line 50, and on the other hand to a separator stage 2 in which the synchronizing component is separated and from which this component is applied to a pulse shaper stage 3 in which there is developed from the leading edge of the line synchronizing impulses an impulse $I_2$ which represents with great accuracy the timing of the television signal.

This impulse is applied to the input of the delay line 10. To avoid reflexions, lines 10 and 50 are terminated at their output ends by respective resistors 19 and 59 having values corresponding to the characteristic impedance Z of the lines. To each tapping of delay line 10 is connected a coincidence stage such as 21, 22, . . . to which are also applied reference impulses $I_1$ received at lead 4, for example from a master impulse generator. The output obtained from each coincidence stage when the pulse are applied to it coincidently is applied to a respective storage device such as 31, 32, each of which in turn controls an associated switch 41, 42 controlling the passage of a signal from the corresponding tapping of delay line 50 to an output lead 5. In the drawing these switches are shown as being mechanical switches ES1, ES2, but in practice electronic switches will be employed.

When a television signal is applied to the arrangement at 1, then that one of coincidence stages 21, 22 . . . will be actuated at which the delayed impulse $I_2$ corresponds in time with the reference impulse $I_1$. This coincidence stage then provides an output signal which closes the associated electronic switch 41, 42 . . . to connect the corresponding tapping of delay line 50 to the output 5 of the arrangement by way of a stage 9, to which the leads coming from all the switches 41, 42 . . . of the arrangement will be connected. The switch-closing condition is retained by the action of an associated store 31, 32 . . . until, immediately before the appearance of the next comparison impulse, the store is returned to normal by a reset pulse *Lö*.

In order to prevent any two of electronic switches 41, 42 . . . being operated at the same time, which is the case when the time difference is just large enough to fall within the overlap range of the compared pulses, the gating stage 6 indicated in broken line in FIGURE 1 may be introduced in the lead 4 by which the reference impulses $I_1$ are applied to coincidence stages 21, 22 . . . . The gating stage is then closed when one of the coincidence stages provides an output. Since the comparison impulse $I_1$ reaches the coincidence stage associated with the subsequent tapping, in the direction of passage of the signal, only somewhat later, this stage cannot deliver an output impulse, since the comparison impulse is lacking.

Figure 2:
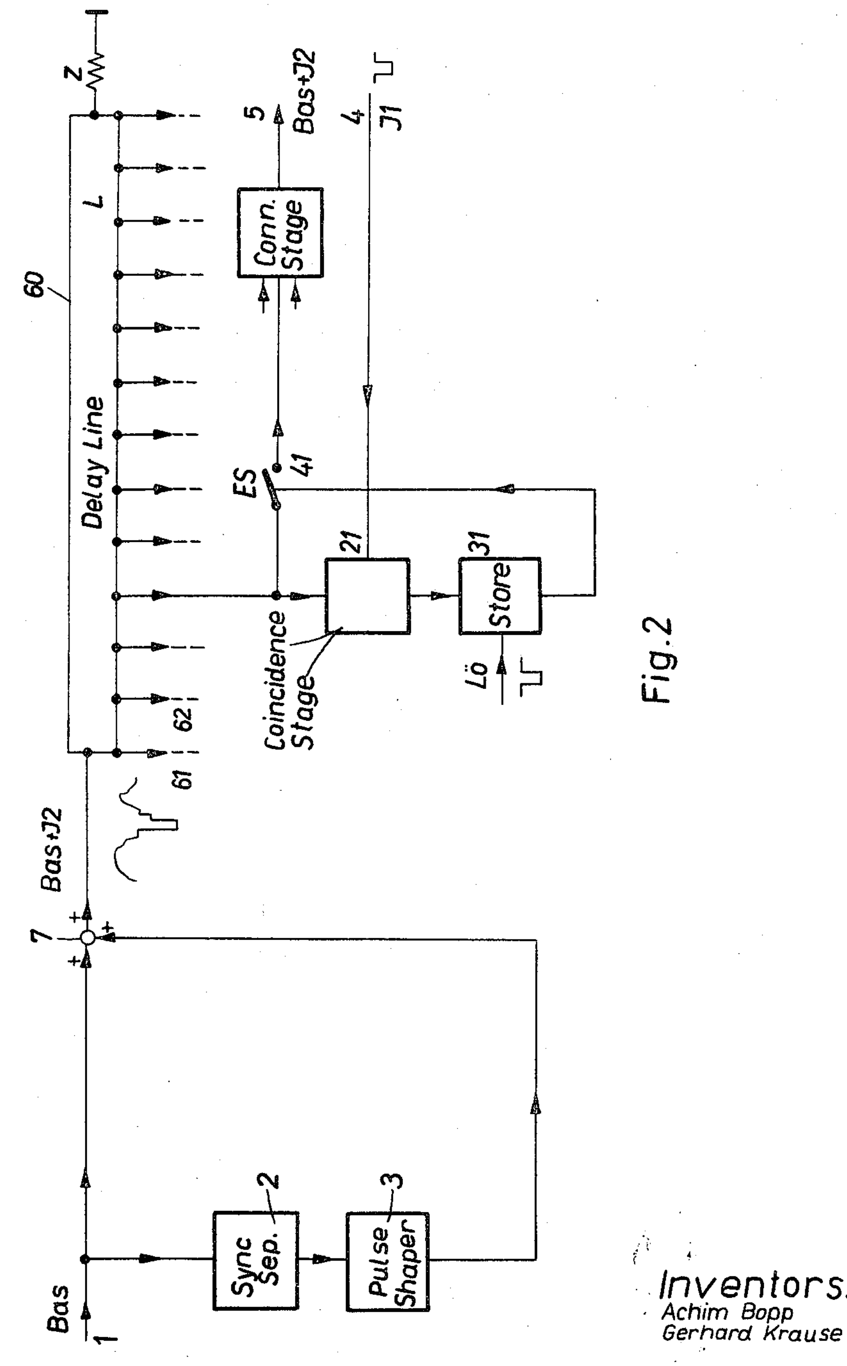
FIGURE 2 shows schematically an embodiment of apparatus using one delay line.

FIGURE 2 shows an arrangement according to the invention making use of a single delay line only to delay both the signal of which the timing is to be corrected and also the impulses used to detect the timing error.

A signal to be corrected which is received at a lead 1 is applied to a delay line 60. From this signal also, as in the arrangement described above in relation to FIGURE 1, there is derived by means of a synchronizing signal separator stage 2 and a pulse shaper stage 3, an impulse which represents as accurately as possible a measure of the timing of the incoming television signal. A narrow pulse timed from the leading edge of the line synchronizing impulse is suitable. At point 7 this impulse is added to the television signal and passes with that signal into the tapped delay line 60. To the tappings 61, 62, . . . of the delay line 60 there are again connected respective coincidence stages such as 21, and storage devices such as 31. The coincidence stage connected to that tapping of delay line 60, the signal transit time to which corresponds to the timing error to be corrected, provides an output signal which is retained in the associated store and by way of an electronic switch such as 41 connects that tapping of the delay line with the output 5 of the arrangement.

Figure 3:
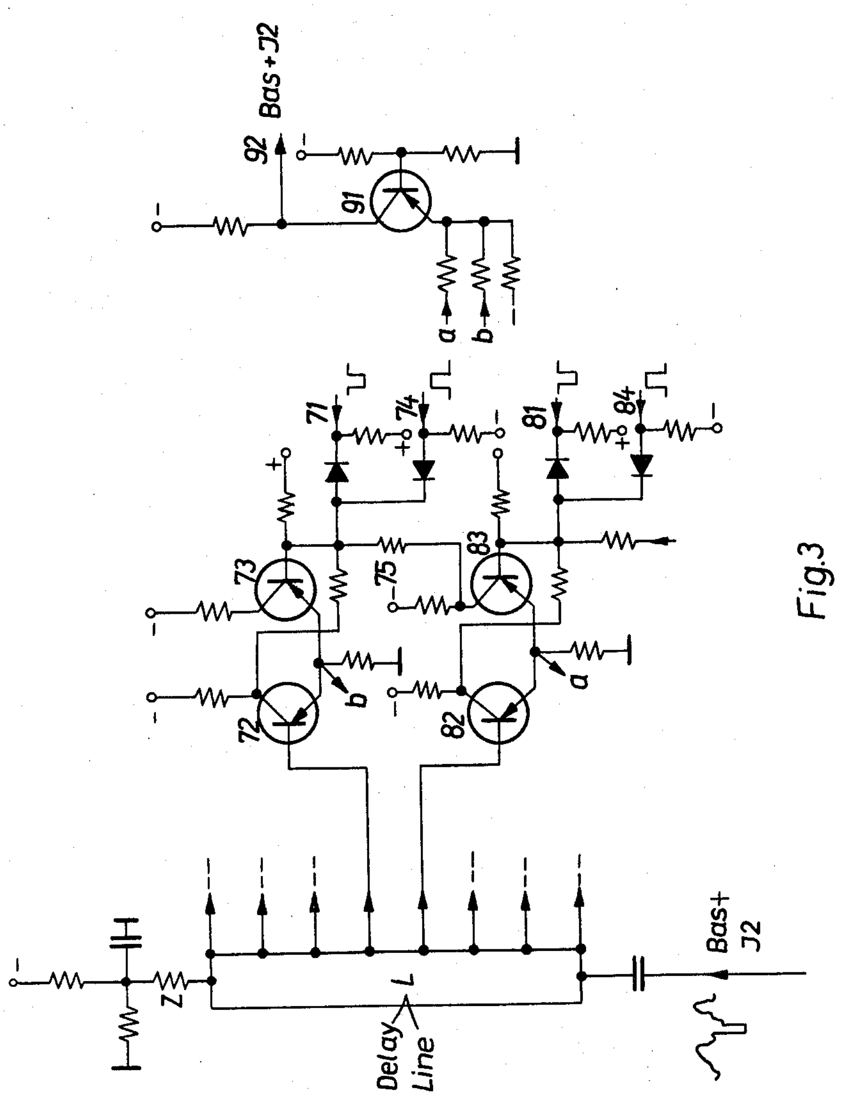
FIGURE 3 shows the circuit diagram of an arrangement suitable for use as a coincidence stage and as the associated switch used in apparatus as described in relation to FIGURE 2.

FIGURE 3 shows an embodiment of a circuit arrangement for performing the functions of the coincidence stages, the storage devices and the electronic switches associated with two adjacent tapping points of the delay lines in the arrangement described above in relation to FIGURE 2. After re-set impulses have been applied to the circuit at 71 and 81, transistors 72 and 82 are cut off, while current flows in the transistors 73 and 83. If impulses now arrive simultaneously at one of the emitter-coupled pairs 72, 73 or 82, 83, from the delay line L and from the inputs 74, 84 for the reference impulses, then this pair goes into the alternative stable condition in which transistor 72 or 82 is operative. The working point for the transistor in this condition is so chosen that it operates as an impedance converter and the television signal arriving at the base of the transistor from the delay line is fed out by way of connection *a—a* or *b—b* to the emitter of an adding transistor 91, and thence to the output 92 of the arrangement. Resistor 75 connected between the collector of transistor 83 and the base of transistor 73 shifts the base potential of transistor 73, which is connected in the gating circuit for the next subsequent tapping in the delay line, so that in the case of coincidence this retains the previously adopted stable condition. The television signal therefore passes only by way of one tapping of the delay line to the output 92.

Figure 4:
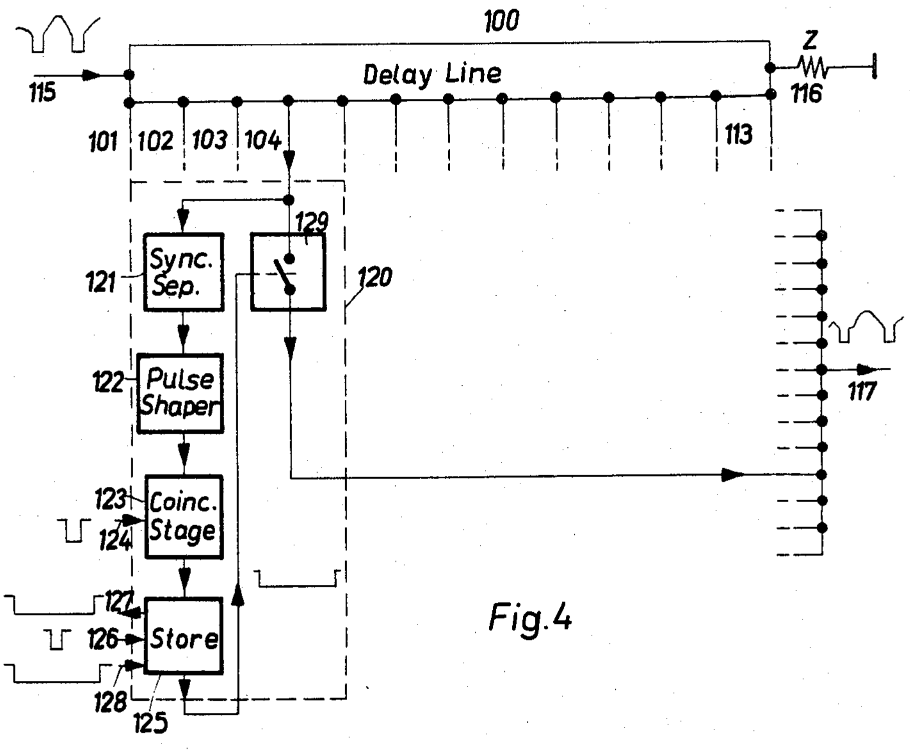
FIGURE 4 shows the block circuit diagram of another arrangement of apparatus for carrying out the present invention.

In FIGURE 4, reference 100 denotes a delay line which is provided with tapping points 101, 102, 103, 104 . . . 113. The delay times between successive tappings are equal to one another. Thirty tappings may be provided, for example, so that for a total delay time of e.g. 1.1 microseconds the delay between successive tappings amounts to 37 nanoseconds. A television signal subject to timing errors is applied to the delay line at 115. In order to prevent reflexions the far end of the line is terminated by a resistor 116 equal in value to the characteristic impedance Z of the line.

To each tapping of the line is connected an arrangement 120, which derives a sharp impulse from the synchronizing signal of the television signal transmitted over the line, compares the timing of this impulse with a reference impulse and on coincidence of the compared pulses switches the television signal through to the output of the arrangement at 117. In the drawing only one such device 120 is shown for the sake of clarity in illustration, this device being connected to tapping 104. Similar devices will be connected to all the other tappings 101 . . . 113 of delay line 100.

The horizontal synchronizing impulse is separated from the television signal taken from tapping 104 in the pulse separator stage 121 and from this a narrow impulse is derived in pulse shaper stage 122. For this purpose a narrow amplitude range may be slipped from the horizontal synchronizing impulse, and after appropriate amplification the resultant signal may be differentiated, so that the timing of the narrow impulse corresponds with great accuracy to that of the leading edge of the horizontal synchronizing impulse. In a coincidence stage 123 this narrow impulse is compared with a reference impulse applied at 124. Stage 123 delivers an output signal only when the two applied impulses coincide in time. This output signal is stored in a store 125 until shortly before the appearance of the next reference impulse, and is then made ineffective by a reset pulse applied at 126. The store also supplies at 127 an impulse for blocking the preceding or following store, and receives an impulse of this kind at 128 from neighbouring stores.

The signal generated on coincidence of the impulses applied to the arrangement 125 actuates a switch 129, which is symbolically represented in the drawing. In practice an electronic switch will be used at this position. Upon coincidence of the impulses applied to stage 123, switch 129 connects the relevant tapping of the delay line, tapping 104 in the present case, to the output 117 of the arrangement, to which the output leads of all the devices such as 120 of the arrangement will be connected.

Figure 5:
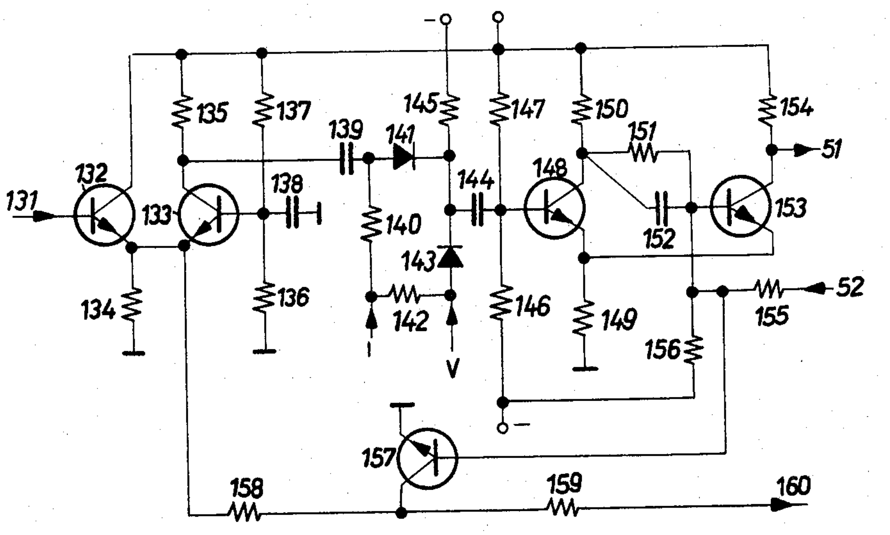
FIGURE 5 shows the circuit diagram of apparatus suitable for use as part of the arrangement described in relation to FIGURE 4, for forming the impulse used for comparision in time with the reference impulse and for switching the delayed signal from a tapping of the delay line to an output terminal.

FIGURE 5 shows the circuit arrangement of an apparatus suitable for performing the functions of the device 120 of FIGURE 4. A television signal received at 131 from a tapping of a delay line is applied by way of a transistor 132 and the series combination of two resistors 158, 159 to output lead 160, provided that a switching transistor 157 connected between earth and the junction of resistors 158, 159 is not conductive. Together with transistor 133, transistor 132 operates as a double-ended limiter, which slips a narrow amplitude range from the synchronizing impulse in the television signal. The base potential of transistor 133 is held at an appropriate D.C. level by means of resistors 136, 137 by which it is connected respectively to earth and to the terminal of a positive voltage source, and is earthed for signal potentials by way of a capacitor 138. The clipped signal is differentiated in an RC circuit 139, 140, so that a narrow impulse having a half-amplitude width of, for example, 50 nanoseconds is available across collector resistor 135 of transistor 133. This impulse is fed by way of a capacitor 139 to the associated coincidence stage.

The narrow pulse is applied by way of capacitor 139 to the anode of a diode 141, the cathode of which is returned by way of a resistor 145 to the terminal of a negative supply. The cathode of diode 141 is also connected to the cathode of a further diode 143, to the anode of which are applied reference impulses received at V. Only when both pulses appear simultaneously does an impulse arise at the common cathode point, to be applied by way of a capacitor 144 to the base of a transistor 148. The bias potential of this base is fixed by means of resistors 146, 147 through which it is returned to the terminals of respective negative and positive supplies. Transistor 148 shares a common emitter-lead resistor 149 with a further transistor 153. The collectors of the two transistors are taken to the positive supply by way of respective load resistors 150, 154. The collector of transistor 148 is also coupled to the base of transistor 153 by way of the parallel combination of a resistor 151 and a capacitor 152. Transistors 148 and 153 with their associated components form a bistable circuit which is triggered by the pulse applied from the coincidence stage into a condition in which there is applied to the base of switching transistor 157 a voltage such as to make this transistor conductive. Transistor 157 is connected between the junction of resistors 158, 159 in the signal output lead and earth, so that when it is conductive the signal is short-circuited to earth and no output signal appears at 160.

When the applied impulses coincide, circuit 148 . . .

153 is driven into its alternative condition, in which transistor 157 is cut off, so that signals may now pass from input 131 to output 160. In addition, circuit 148 . . . 153 provides at a terminal 51 a cut-off impulse which is applied to a neighbouring store to prevent this becoming actuated at the same time. Similar cut-off pulses are applied to circuit 148 . . . 153 by way of lead 52 from a neighbouring stage, when this stage passes signals from the adjacent tapping on the delay line to the output.

Figure 6:
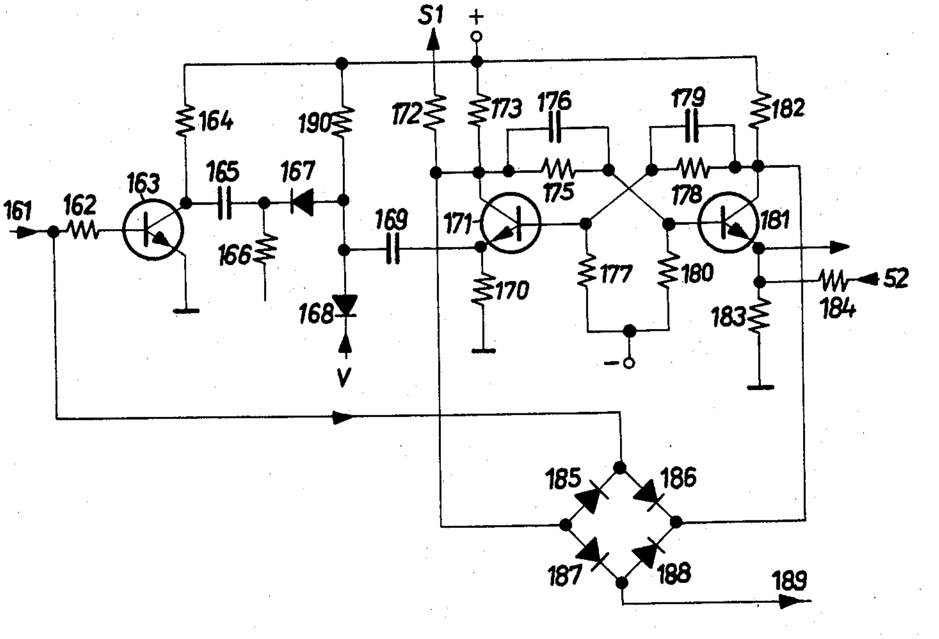
FIGURE 6 shows the circuit diagram of alternative apparatus for this purpose.

FIGURE 6 shows an alternative embodiment of a circuit arrangement for use as device 120 of FIGURE 4, for separating and shaping the synchronizing impulses. Here the transistor 163, to the base of which television signals received at 161 are applied by way of a resistor 162, acts as a limiter so that only the synchronizing component of the applied television signal appears across collector load resistor 164 of transistor 163. The synchronizing signals appearing across the load resistor 164 are applied to a differentiating circuit, consisting of a capacitor 165 and a resistor 166, which yields narrow spike signals corresponding to the rising and falling transitions in the synchronizing signal. Diodes 167 and 168 together form an AND circuit, yielding a pulse across a resistor 190, by which the common anode connection of these diodes is returned to the positive line, only when signals are applied to the cathode of both diodes simultaneously. The narrow pulse separated from the synchronizing signal is applied to the cathode of diode 167, while reference pulses are applied at V to the cathode of diode 168. Coincidence pulses arising at the common anode point are applied by way of a capacitor 169 to actuate a bistable circuit comprised by two transistors 171, 181 and their associated components. The emitters of transistors 171, 181 are returned to earth by way of individual resistors 170 and 183 respectively. The collectors of the transistors are returned to the positive supply line by way of respective load resistors 173, 182 and the bases are returned to a negative bias source by way of resistors 177 and 180 respectively. The transistors are cross-coupled by parallel resistor-capacitor combinations 175, 176 and 178, 179 which are connected from the collector of transistor 171 to the base of transistor 181 and from the collector of transistor 181 to the base of transistor 171 respectively. A cut-off pulse for neighbouring stages is fed out at S1 from the collector of transistor 171 by way of a resistor 172, and a cut-off pulse from an adjacent stage is fed in at 52 and applied by way of a resistor 184 to the emitter of transistor 181.

In this circuit arrangement the electronic switch is constituted by a four-diode bridge, comprising diodes 185, 186, 187 and 188, of which one diagonal is connected in the signal path from input 161 to an output 189 and the other diagonal points are connected directly to the collectors of transistors 171 and 181 respectively.

Figure 7:
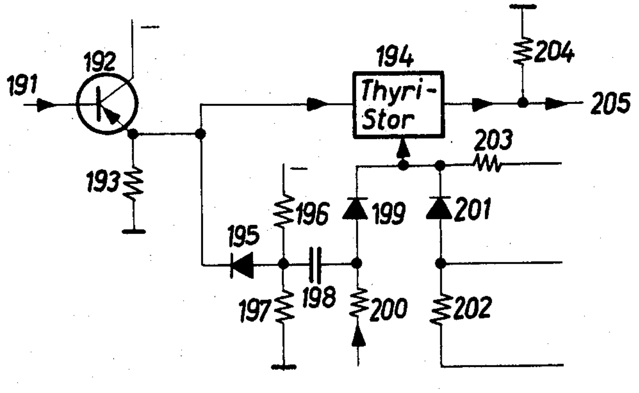
FIGURE 7 shows a partially schematic circuit diagram of another embodiment of apparatus for this purpose.

In the circuit arrangement illustrated by FIGURE 7, a thyristor 194 is used as the electronic switch. Television signals received at an input 191 are applied directly to the base of a pnp-transistor 192, of which the collector is taken directly to the negative supply line and the emitter is returned to earth by way of a load resistor 193. Signals appearing across load 193 are applied firstly to the input electrode of thyristor 194 and secondly to the cathode of a diode 195, the anode of which is so biased, by being connected to the negative line and to earth by way of respective resistors 196, 197, that it passes only the synchronizing component of the applied signal.

The pulses derived by limiter 195 may be very brief, for example, less than 30 nanoseconds duration, so that cut-off impulses for the neighbouring stages are unnecessary, as the voltage applied to the thyristor in these stages willl have fallen so far that the device cannot be triggered by a simultaneously appearing control impulse. The diodes 199 and 201 again form a logical AND stage for determining coincidence between the brief pulses derived from the television signal and the reference impulses. When coincidence is achieved the AND circuit provides a pulse which drives the thyristor 194 into the conductive condition and allows the incoming television signal to pass to an output at 205.

Other bistable solid-state devices may be used to replace the thyristor, such as four-element diodes, tunnel diodes, pnpn transistors, double-base diodes or other devices operating in a similar manner, possibly combined with transistors in known manner.

In another embodiment of apparatus according to the invention a television signal subject to timing errors is applied to a cascade-connected plurality of delay circuits having delay times decreasing in accordance with a geometric progression with a common factor of 0.5. The timing of the signal at the output of each delay line is compared with a reference signal and the resultant error voltage is used to control switch means operable to pass the signal to the next subsequent line from either the beginning or from the end of the present line, so that the residual timing error falls within the delay time available in the subsequent stages.

This apparatus possesses the advantage that the accuracy of timing error correction is independent of the accuracy of the delay devices used to delay the signal, since the system operates as a feedback system and not as a forward control system. Furthermore, the cost of the system is less. In addition the delay lines used to delay the signal are simpler to construct, as it is not necessary to provide them with tappings.

Figure 8:
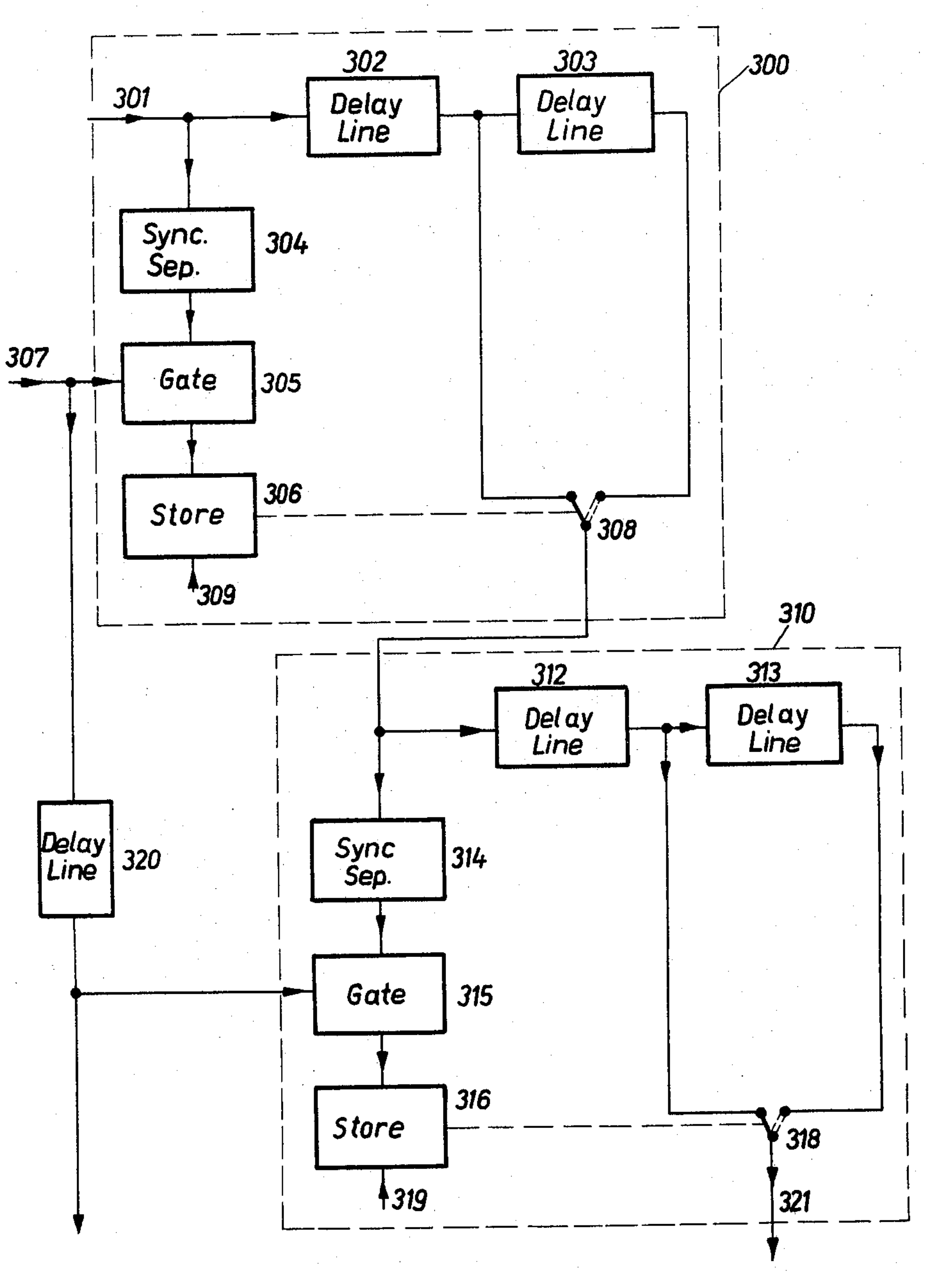
FIGURE 8 shows a block schematic diagram of a modified form of apparatus according to the invention.

The arrangement shown in FIGURE 8 receives at 301 a television signal subject to timing errors. In a device 304 the synchronizing component is derived from this incoming signal, and from the synchronizing component an impulse of which the leading edge has a predetermined relation to the leading edge of the synchronizing signal. A gate circuit 305 delivers an output pulse only when an impulse thus derived from the incoming signal and a shorter reference impulse received at 307 are simultaneously applied to it. The output pulse from gate 305 is stored in a storage device 306 until a re-set pulse is received at 309 shortly before the beginning of the next pulse comparison operation.

The television signal received at 301 also passes to a delay line 302 in which the signal is delayed so that it is applied to the input of device 304 before it is applied to the input of a delay line 303.

If the reference impulse applied to lead 307 arrives within the duration of the impulse derived from the television signal by device 304, then the output of delay line 303 is passed on by way of a change-over switch 308 (in the position of the switch shown in broken line) so that the output television signal is additionally delayed by the delay of the delay line 303. If on the other hand the reference impulse received at 307 and that from gate 304 do not coincide, then gate 305 does not provide an output signal and the switch 308 is set to the position shown in heavy line, so that the output television signal is taken from delay line 302 and no additional delay is effected.

The television signal selected by switch 308 now passes into a further stage 310, which is constructed almost exactly as stage 300 described above with the sole difference that the additional delay line 313 provides only half the delay of delay line 303 in stage 300. As before the incoming television signal is applied to a device 314 which derives an impulse of which the leading edge has a predetermined timing with respect to that of the synchronizing component of the television signal. This pulse is applied to a comparison circuit 315 in which its timing is compared with that of the reference impulse which is delayed with respect to the reference impulse received at 307, in a delay line 320, by a delay determined as described below. If the pulse developed by device 314 is applied to coincidence gate 315 at the same time as the comparison pulse, then switch 318 is actuated to the position shown in broken line, thus including delay line 313 in the signal path. If coincidence is not present, switch 318 is actuated to the position shown in solid line and no delay additional to that introduced by delay line 312 is included in the signal path. As before, delay line 312 serves to ensure that the impulses derived from the synchronizing component of the television signal reach the input of coincidence gate 315 before the television signal reaches the input of delay line 313.

The television signal fed out at 321 then passes into further stages of the same kind, the switched delay in each of these stages being half that in the preceding stage. The number of stages depends upon the total timing error which is to be corrected and upon the accuracy of timing correction which is required, for example, if the allowable error is 30 nanoseconds, five stages will be required in order to obtain a control range of 1.86 microseconds.

Figure 9:
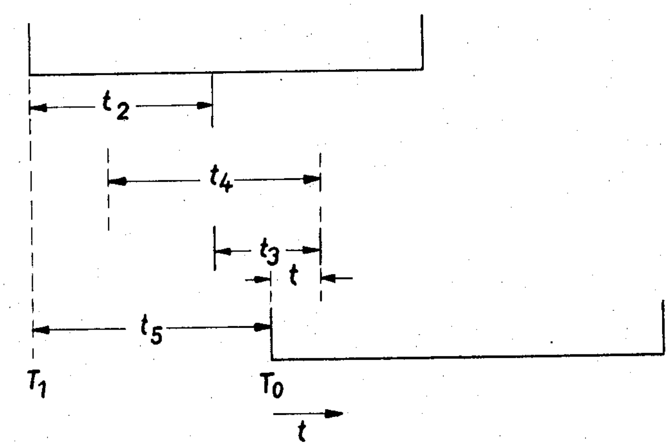
FIGURES 9 and 10 are timing diagrams illustrating signals appearing in the apparatus described with reference to FIGURE 8.

In FIGURE 9, $T_0$ represents the nominal position of the leading edge of the synchronizing signal, the time $t_3$ is the delay time of the switched delay line 313 of FIGURE 8. The time $t$ represents the maximum residual error in the output signal from the stage concerned, which is equal to half the delay time $t_3$. When the edge 10 occurs within the time interval $t_4$, equal to twice the delay time of the switched delay time 313 the television signal subject to delay must be applied to that line. The time $t_2$ is the delay time in the delay circuit 312. At instant $T_1$ the reference impulse received at 307 enters the gate circuit 315. Time $t_5$ is the difference in timing between the reference impulse and the pulse derived from the leading edge of the synchronizing signal. Time $t_2$ is chosen so that the change-over of switch 318 is effected during the front porch of the synchronizing signal and that the disturbances arising from the switching operation have decayed when the leading edge of the sychronizing impulse occurs. This requirement need be met only in the later stages of the arrangement.

If there is no timing error in the applied television signal, then in the signal at the input of delay line 312 the synchronizing signal occurs at instant $T_1$. This input signal is simultaneously the output signal of the preceding stage of the arrangement. The timing of the impulse in the preceding stage can be determined in a similar manner from the timing of the reference edge of this impulse. In a corresponding manner the pulse timings for an arbitrary number of stages can be determined. Given the pulse timings, the delay times of the delay line 320 may be determined.

Figure 10:
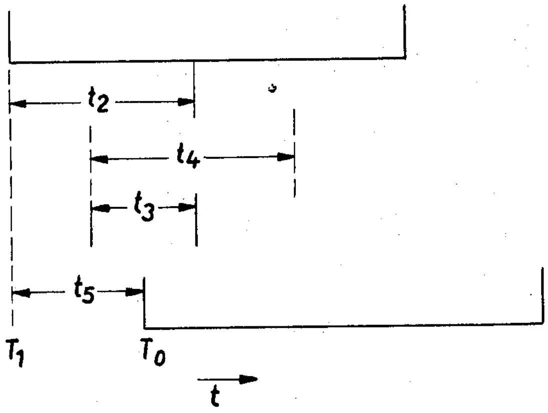

FIGURE 10 shows alternative timings for the signals appearing in the arrangement of FIGURE 8. In this case switch 318 is connected to the output of delay line 313 if the impulse derived from the television signal appears later than instant $T_0$. The delay time of delay line 320 may in this case be negative, that is, the reference signal must be fed in from the other end.

In the description of the arrangement shown in FIGURE 8 and of its mode of operation it has been assumed that a brief reference impulse and a longer impulse derived from the television signal are used for comparison to determine coincidence. This is not necessary to the operation of the apparatus, however. With suitable choice of the devices 314, 315, 316 in FIGURE 8 and of the timings of the impulses, it is possible to make the pulse derived from the television signal short and the reference impulse long. Finally, both pulses may be made longer and reliance placed upon a determination of whether or not both pulses are present.

The re-set impulse applied by way of 309 or 319 to the stores 306, 316 is not in principle necessary if the store is constructed so that it has one predetermined condition when coincidence is present and another predetermined condition in the absence of coincidence, without regard to the instantaneous condition of the switch.

It has been assumed throughout the description that the leading edge of the synchronizing impulses is used as the reference edge. It would be possible in principle for the apparatus to be modified to use the trailing edge of the pulse as the reference edge, or to add a reference impulse to the television signal for the specific purpose of timing error correction.

What is claimed and desired to be secured by Letters Patent is:

1. The method of correcting timing errors in a signal containing a repetitive component nominally having a predetermined periodicity, which comprises the steps of: applying said signal to a series-connected succession of delay devices; comparing the timing of said signal at the output of each said delay device with the timing of a reference signal having said predetermined periodicity; deriving by said comparison a control voltage related to the difference in timing of said component in said output signal and of said reference signal; and employing said control voltage to actuate switch means controlling the passage of said signal through a selected one of said delay devices so as to reduce said difference to a minimum.

2. Apparatus for correcting timing errors in a signal containing a repetitive component nominally recurrent at a predetermined periodicity, comprising in combination: a source of said signal; a series-connected plurality of delay devices each having an output, a plurality of comparison means each operative when fed with two signals of like recurrence rate to derive a control voltage predeterminedly related to the difference in timing between said signals; means connecting a signal appearing at the output of each said delay means to an individual one of said comparison means; a source of a reference signal having said predetermined periodicity; circuit means connecting said reference signal alike to all said comparison means; a plurality of voltage-actuated switch means each controlling the passage of said signal through a predetermined one of said delay devices; and circuit means connecting said control voltage from each said comparison means to control a selected one of said switch means so as to reduce said difference to a minimum.

3. Apparatus for correcting timing errors in a television signal containing a synchronizing component nominally recurrent at a predetermined periodicity, comprising in combination: a source of said televsion signal; first and second similar, equitemporally tapped delay lines; sync separator means and pulse shaper means operating when fed with a television signal to develop impulses predeterminedly timed with respect to said synchronizing component; circuit means applying said television signal from said source to said sync separator means and said pulse shaper means and to said first delay line; circuit means applying said impulses from said pulse shaper means to said second delay line; a plurality of coincidence circuit means, each responsive to two applied pulses signals to yield an output voltage when and only when said pulses are coincident; circuit means applying signals from each tapping of said second delay line to an individual one of said coincidence circuits; a source of reference impulses recurrent at said predetermined periodicity; circuit means applying reference pulses from said source to each said coincidence circuit alke; an output terminal; a plurality of voltage-actuated switch means individually connecting a respective tapping of said first delay line to said output terminal; and circuit means connecting said output voltage from said coincidence circuit connected to a predetermined one of said tappings of said second delay line to control said switch means connected to the corresponding tapping of said first delay line.

4. Apparatus in accordance with claim 3 and further comprising: storage means interposed between each said coincidence circuit means and said individual switch means; said storage means being operable by said output voltage to a condition in which it develops a corresponding output voltage and to remain in said condition until reset by an applied reset voltage; a source of reset voltage pulses timed to occur shortly before each said reference pulse; and means for applying said reset pulses to all said storage means alike.

5. Apparatus in accordance with claim 3 and further comprising a gate circuit operable by an applied voltage to close a signal path therethrough; said gate circuit being connected in said circuit between said reference pulse and said coincidence means; and circuit means applying said output voltage to said gate means.

6. Apparatus for correcting timing errors in a television signal containing a synchronizing component nominally recurrent at a predetermined periodicity, comprising in combination: a source of said television signals; an equitemporally tapped delay line; sync separator means and pulse shaper means operating when fed with a television signal to develop impulse predeterminedly timed with respect to said synchronizing component; circuit means applying signals from said source to said delay line and to said sync separator means and said pulse shaper means; circuit means applying signals from said pulse shapers means also to said delay line; a plurality of coincidence circuit means, each being responsive to two applied pulse signals to yield an output voltage when and only when said applied pulses are coincident; a plurality of voltage-actuated switch means; an output terminal; means connecting each said tapping of said delay line to an individual one of said coincidence circuit means and to an individual one of said switch means; circuit means connecting all said switch means in common to said output terminal; and circuit means applying said output voltage from each said coincidence circuit means to said switch means connected to the same tapping of said delay line.

7. Apparatus for correcting timing errors in a television signal containing a synchronizing component nominally recurrent at a predetermined periodicity; comprising in combination: a source of said television signals; an equitemporally tapped delay line; sync separator means and pulse shaper means operating when fed with a television signal to develop impulses predeterminedly timed with respect to said synchronizing component; circuit means applying signals from said source to said delay line and to said sync separator means and said pulse shaper means alike; circuit means applying pulse signals from said pulse shaper means to said delay line in superposition upon said television signals; coincidence circuit means connected to each said tapping point, said means operating when fed with two pulse signals to yield an output voltage when and only when said pulses are coincident; a source of reference pulses recurrent at said predetermined periodicity; circuit means applying said reference pulses to said coincidence means; voltage storage means operating to retain and supply an applied voltage until reset by an applied pulse; a source of reset pulses; a connection applying said output voltage from said coincidence means to said voltage store; a connection applying said reset pulses to said voltage store; voltage-actuated switch means operable to connect said tapping to said output; and circuit means connecting said voltage supplied from said store to operate said switch.

8. Apparatus in accordance with claim 7 in which said coincidence circuit means, said voltage-actuated switch means and said voltage storage means associated with a single tapping of said delay line are together comprised by the combination of first and second transistors each having a base, and emitter and a collector; a source of direct current having positive and negative poles, a common resistor connecting said emitters to the positive pole of said source individual load resistors connecting said collector of each said transistor to said negative pole; a direct connection from said tapping to said base of said first transistor; a resistor connecting said collector of said first transistor to said base of said second transistor; a source of positive bias potential; a resistor connecting said base of said second transistor to said bias source; a source of negative-going reset pulses; a source of positive-going reference pulses recurrent at said predetermined frequency; a first diode; a direct connection from the base of said second transistor to the anode of said first diode; circuit means applying said reset pulses to the cathode of said first diode; a second diode; a direct connection from said base of said second transistor to the anode of said second diode; circuit means applying said reference pulses to the anode of said second diode; and means connected to said emitters of said transistors for connecting said television signals to said output.

9. Apparatus for correcting timing errors in a television signal containing a synchronizing component nominally recurrent at a predetermined periodicity, comprising in combination: a source of said television signals; an equitemporally tapped signal delay line; circuit means connecting said signal from said source to said line; a plurality of voltage controlled switch means; an output terminal; circuit means connecting each said tapping of said delay line to an individual one of said switch means; means connecting all said switch means alike to said output terminal; a plurality of sync separator means and pulse shaper devices each operating when fed with a television signal to develop an impulse predeterminedly timed in relation to said synchronizing component; a like plurality of coincidence circuit means each responsive to two applied impulses to yield an output voltage when and only when said impulses are coincident; circuit means connecting each said tapping of said delay line to an individual one of said pulse shaper means; circuit means connecting impulses from each said pulse shaper means to an individual one of said coincidence circuit means; a like plurality of voltage storage means operating to retain and supply an applied voltage until reset by an applied pulse; a source of reset pulses; predeterminedly related in time to said reference pulses; a connection from said reset source to said voltage store; means connecting said output voltage from each said coincidence means to an individual one of said voltage stores, and means connecting said output voltage from each said voltage storage means to said switch means connected to that tapping of said delay line to which is connected the pulse shaper means from which said impulses are applied to said coincidence circuit means supplying said output voltage to said store.

10. Apparatus according to claim 9 in which each said voltage storage means comprises also means responsive to an applied potential for inhibiting the action of said store; means responsive to the storage of a said voltage in said store for developing a said inhibiting potential; and circuit means are provided connecting said inhibiting potential from each said store to an adjacent said store.

11. Apparatus according to claim 9 in which said switch means comprises the combination of series connected resistors joined at a point connecting a said tapping to said output and a transistor having base, emitter and collector electrodes; the collector and emitter of said transistor being connected to said point and to earth respectively and circuit means for applying said voltage to said base.

12. Apparatus according to claim 9 in which said switch means comprises first and second diodes having their anodes commoned second and third diodes having their cathodes commoned; connection from said tapping to the cathode of said first and the anode of said third diode; connections from the cathode of said second and the anode of said fourth diode to said output; and means for selectively applying betwwen said commoned anodes and cathodes potentials causing said diodes to become conductive or to be cut off.

13. Apparatus according to claim 9 in which said switch means comprises a bistable solid-state active device having input, output and control electrodes; means connecting said tapping to said input electrode; means connecting said output electrode to said output and means applying said output voltage to said control electrode.

14. Apparatus for correcting timing errors in a television signal containing a synchronizing component nominally recurrent at a predetermined periodicity, comprising in combination: a series-connected plurality of signal delay devices having progressively shorter signal delays, each said device having an input and an output; a source of said signals; circuit means applying signals from said source to said series of delay devices; a plurality of voltage-operated switch means individually connected to provide a signal path connecting the input of one said delay device selectively to the input or to the output of the preceding one in said series of said delay devices; a plurality of sync separator means and pulse shaper means operating when fed with a television signal to develop impulses predeterminedly timed with respect to said synchronizing component; circuit means applying television signals from the input of each said delay device to an individual one of said pulse shaper means; a plurality of coincidence devices each responding to two applied pulse signals by providing an output voltage when and only when said pulses are coincident; a source of reference pulses recurrent at said predetermined periodicity; circuit means connecting impulses from each said pulse shaper means to an individual one of said coincidence circuits; circuit means connecting said reference pulses to all said coincidence means; and circuit means connecting said output voltage from each said coincidence device to control said switch means supplying signals to the input of said delay means.

15. Apparatus according to claim 14 and comprising also a plurality of voltage storage devices, each operating to store and to supply an applied voltage until reset by an applied pulse; a connection from each said coincidence device to an individual one of said storage devices; means connecting said supplied voltage from each said storage device to a corresponding one of said switch means; a source of reset pulses and means connecting said reset pulses to all said storage devices.

16. Apparatus according to claim 14 and comprising a plurality of further signal delay means; a connection from each said tapping to an individual one of said further delay means and a connection from said signal delay means to an individual one of said coincidence devices.

17. Apparatus according to claim 14 and comprising also a plurality of reference signal delay means connected from the input of each said coincidence means to the input of that one of said coincidence means connected to the next successive one of said tappings.

References Cited

UNITED STATES PATENTS

| | | | |
|---|---|---|---|
| 3,210,464 | 10/1965 | Felgel-Farnholz | 178—6.6 |
| 3,347,997 | 10/1967 | Woodruff | 178—6.6 |

ROBERT L. GRIFFIN, *Primary Examiner.*

H. BRITTON, *Assistant Examiner.*